US009063960B2

(12) United States Patent
Mohanty et al.

(10) Patent No.: US 9,063,960 B2
(45) Date of Patent: Jun. 23, 2015

(54) SYSTEMS AND METHODS FOR PERFORMING CUSTOMIZED LARGE-SCALE DATA ANALYTICS

(71) Applicant: Symantec Corporation, Mountain View, CA (US)

(72) Inventors: Shubhabrata Mohanty, Magarpatta (IN); Sujit Manolikar, Pimple Saudagar (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/025,755

(22) Filed: Sep. 12, 2013

(65) Prior Publication Data

US 2014/0156588 A1    Jun. 5, 2014

Related U.S. Application Data

(60) Provisional application No. 61/732,280, filed on Nov. 30, 2012.

(51) Int. Cl.
*G06F 17/30* (2006.01)

(52) U.S. Cl.
CPC .................. *G06F 17/30289* (2013.01)

(58) Field of Classification Search
CPC ............... G06F 17/30554; G06F 17/30592; G06F 17/30572
USPC .......................................... 707/607
See application file for complete search history.

(56) References Cited

U.S. PATENT DOCUMENTS

| 6,628,312 | B1 * | 9/2003 | Rao et al. ............... 715/853 |
| 7,320,001 | B1 * | 1/2008 | Chen ...................... 705/35 |
| 2003/0154191 | A1 * | 8/2003 | Fish et al. ................ 707/2 |
| 2004/0174397 | A1 * | 9/2004 | Cereghini et al. .......... 345/855 |
| 2009/0106843 | A1 * | 4/2009 | Kang et al. ................. 726/25 |

OTHER PUBLICATIONS

"Oracle", http://www.oracle.com/index.html, as accessed Nov. 29, 2012, (Dec. 19, 1996).
"Microsoft", http://www.microsoft.com/en-us/default.aspx, as accessed Nov. 29, 2012, (Feb. 28, 2007).
"Datameer", http://www.datameer.com/, as accessed Nov. 29, 2012, (Nov. 26, 2009).

(Continued)

*Primary Examiner* — Khanh Pham
(74) *Attorney, Agent, or Firm* — ALG INTELLECTUAL PROPERTY, LLC

(57) ABSTRACT

A computer-implemented method for performing customized large-scale data analytics may include (1) providing a logical-data-model user interface to enable modifying a logical data model of a relational multi-dimensional analytic database, (2) receiving, via the logical-data-model user interface, user input to modify the logical data model of the relational multi-dimensional analytic database, (3) modifying the logical data model of the relational multi-dimensional analytic database based on the user input, (4) providing a visualization user interface, based on the logical data model, to enable performing online analytical processing operations, and (5) receiving, via the visualization user interface, a request to perform an online analytical processing operation that provides a view of data stored within the relational multi-dimensional analytic database in accordance with the logical data model. Various other methods, systems, and computer-readable media are also disclosed.

19 Claims, 9 Drawing Sheets

(56) References Cited

OTHER PUBLICATIONS

"Teradata", http://www.teradata.com/?LangType=1033, as accessed Nov. 29, 2012, (On or before Nov. 29, 2012).

"Apache", http://httpd.apache.org/, as accessed Nov. 29, 2012, (Nov. 9, 2000).

"Pentaho", http://www.pentaho.com/, as accessed Nov. 29, 2012, (Aug. 12, 2005).

* cited by examiner

SYSTEMS AND METHODS FOR PERFORMING CUSTOMIZED LARGE-SCALE DATA ANALYTICS

CROSS REFERENCE TO RELATED APPLICATION

This application claims priority to U.S. Provisional Application No. 61/732,280, titled "DATA ANALYTICS PLATFORM FOR LARGE-SCALE DATA IN SECURITY DOMAINS" and filed 30 Nov. 2012, the disclosure of which is incorporated, in its entirety, by this reference.

BACKGROUND

In the digital age, organizations produce, collect, and store increasingly large volumes of data. "Business Intelligence" is a term often used to refer to technologies that leverage raw data to derive information that is useful to an organization in identifying patterns, summarizing trends, and/or making decisions.

Unfortunately, traditional Business Intelligence technologies may come with high procurement, development, and/or deployment costs. Traditional Business Intelligence technologies may also require specialized technical skills and/or fail to process large volumes of data quickly enough for some applications. Furthermore, traditional Business Intelligence technologies may fail to anticipate the measurements that interest each end user, potentially causing the needs of end users to fall out of sync with current user interfaces. Additionally, traditional Business Intelligence technologies may be generally useful for, but not specifically adapted to, specialized applications, which may result in a restricted feature set and/or inefficient processing of existing data.

Accordingly, the instant disclosure identifies and addresses a need for additional and improved systems and methods for performing customized large-scale data analytics.

SUMMARY

As will be described in greater detail below, the instant disclosure generally relates to systems and methods for performing customized large-scale data analytics by modifying logical data models for relational multi-dimensional analytic databases based on user input and performing online analytical processing operations to provide views of data stored within the relational multi-dimensional analytical databases based on the modified logical data models.

In one example, a computer-implemented method for performing customized large-scale data analytics may include (1) providing a logical-data-model user interface to enable modifying a logical data model of a relational multi-dimensional analytic database, (2) receiving, via the logical-data-model user interface, user input to modify the logical data model of the relational multi-dimensional analytic database, (3) modifying the logical data model of the relational multi-dimensional analytic database based on the user input, (4) providing a visualization user interface, based on the logical data model, to enable performing online analytical processing operations, and (5) receiving, via the visualization user interface, a request to perform an online analytical processing operation that provides a view of data stored within the relational multi-dimensional analytic database in accordance with the logical data model.

In some examples, the computer-implemented method may further include performing the online analytical processing operation. In some examples, performing the online analytical processing operation may include (1) generating a database query based on the request and the logical data model and (2) performing the database query. In one embodiment, the online analytical processing operation may include (1) a roll-up operation that creates an aggregated view of data across a specified dimension, (2) a drill-down operation that creates a differentiated view of data within a specified dimensional value, (3) a slicing operation that creates a lower-dimensional view of data by limiting a specified dimension to a specified dimensional value, and/or (4) a dicing operation that creates a view that excludes at least one dimensional value of at least one dimension.

In one embodiment, the computer-implemented method may further include (1) retrieving new data from a plurality of data stores, (2) normalizing the new data, and (3) populating the relational multi-dimensional analytic database with the new data. In some examples, normalizing the new data may include analyzing the new data by correlating data entries within the new data. Normalizing the new data may also include analyzing the new data to identify (1) a security threat, (2) a security vulnerability, (3) a security risk, and/or (4) a security incident trend.

In one embodiment, retrieving the new data from the plurality of data stores may include retrieving the new data from the plurality of data stores in parallel. In this embodiment, normalizing the new data may involve normalizing the new data from the plurality of data stores in parallel.

In some examples, modifying the logical data model of the relational multi-dimensional analytic database based on the user input may include modifying (1) a dimension within the logical data model of the relational multi-dimensional analytic database, (2) a measure within the logical data model of the relational multi-dimensional analytic database, (3) a hierarchical dimension with the logical data model of the relational multi-dimensional analytic database, and/or (4) a cardinality within the logical data model of the relational multi-dimensional analytic database.

In one embodiment, a system for implementing the above-described method may include (1) a providing module that provides a logical-data-model user interface to enable modifying a logical data model of a relational multi-dimensional analytic database, (2) a receiving module that receives, via the logical-data-model user interface, user input to modify the logical data model of the relational multi-dimensional analytic database, (3) a modifying module that modifies the logical data model of the relational multi-dimensional analytic database based on the user input, (4) a visualization module that provides a visualization user interface, based on the logical data model, to enable performing online analytical processing operations, (5) a request module that receives, via the visualization user interface, a request to perform an online analytical processing operation that provides a view of data stored within the relational multi-dimensional analytic database in accordance with the logical data model, and (6) at least one processor configured to execute the providing module, the receiving module, the modifying module, the visualization module, and the request module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) provide a logical-data-model user interface to enable modifying a logical data model of a relational multi-dimensional analytic database, (2) receive, via the logical-data-model user interface, user input to modify the logical data model of the relational multi-dimensional analytic database, (3) modify the logical data model of the relational multi-dimensional analytic database based on the user input, (4) provide a visualization user interface, based on the logical data model, to enable performing online analytical processing operations, and (5) receive, via the visualization user interface, a request to perform an online analytical processing operation that provides a view of data stored within the relational multi-dimensional analytic database in accordance with the logical data model.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
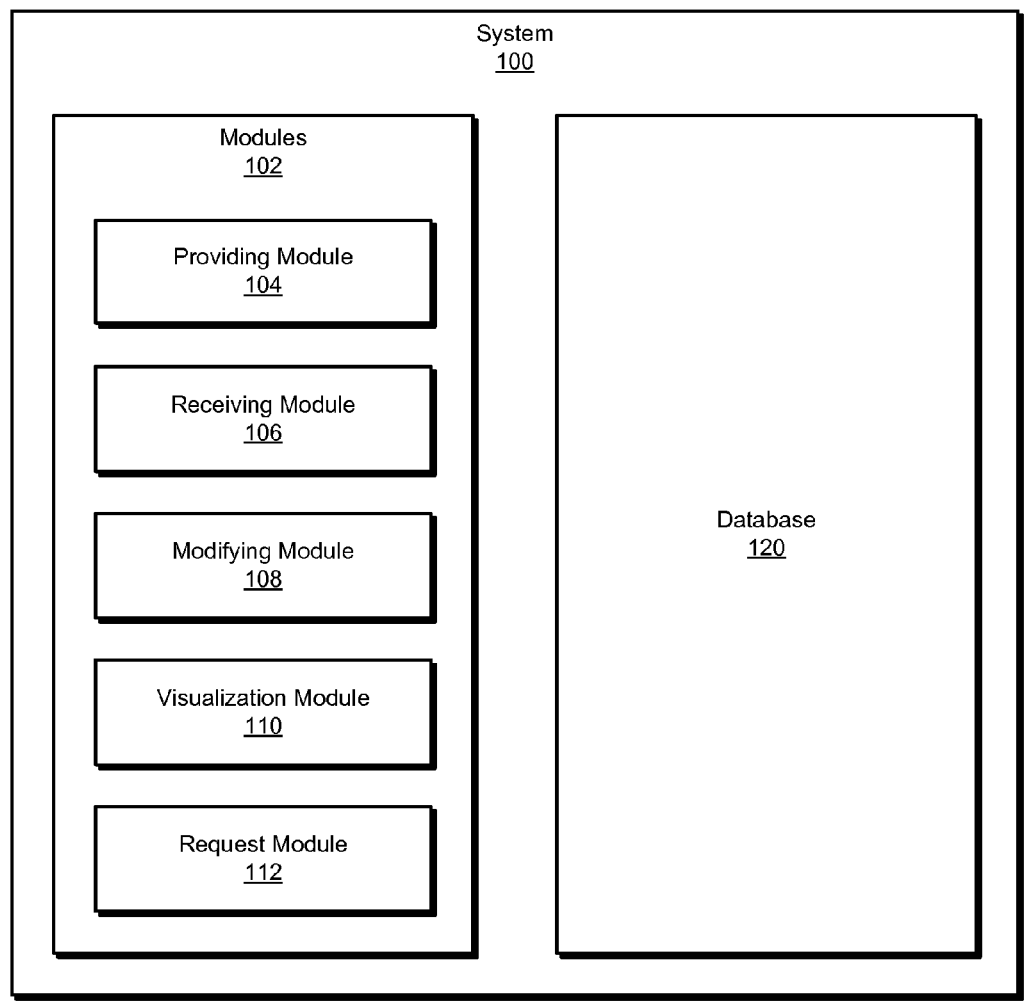
FIG. 1 is a block diagram of an exemplary system for performing customized large-scale data analytics.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for performing customized large-scale data analytics. As will be explained in greater detail below, by modifying logical data models for relational multi-dimensional analytic databases based on user input and performing online analytical processing operations to provide views of data stored within the relational multi-dimensional analytical databases based on the modified logical data models, the systems and methods described herein may provide increased flexibility and customization for analyzing large volumes of data. In some examples, these systems and methods may also be adapted to efficiently analyze data relating to computing security.

The following will provide, with reference to FIGS. 1, 2, 4, and 5, detailed descriptions of exemplary systems for performing customized large-scale data analytics. Detailed descriptions of corresponding computer-implemented methods will also be provided in connection with FIG. 3. Detailed descriptions of a database and data model will also be provided in connection with FIGS. 6 and 7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for performing customized large-scale data analytics. As illustrated in this figure, exemplary system 100 may include one or more modules 102 for performing one or more tasks. For example, and as will be explained in greater detail below, exemplary system 100 may include a providing module 104 that may provide a logical-data-model user interface to enable modifying a logical data model of a relational multi-dimensional analytic database. Exemplary system 100 may additionally include a receiving module 106 that may receive, via the logical-data-model user interface, user input to modify the logical data model of the relational multi-dimensional analytic database. Exemplary system 100 may also include a modifying module 108 that may modify the logical data model of the relational multi-dimensional analytic database based on the user input. In addition, exemplary system 100 may include a visualization module 110 that may provide a visualization user interface, based on the logical data model, to enable performing online analytical processing operations. Exemplary system 100 may also include a request module 112 that may receive, via the visualization user interface, a request to perform an online analytical processing operation that provides a view of data stored within the relational multi-dimensional analytic database in accordance with the logical data model. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or client 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data that is subject to online analytical processing. In some examples, database 120 may include a data warehouse and/or a relational multi-dimensional analytic database 210 shown in FIG. 2.

Database 120 may represent portions of a single database or computing device or a plurality of databases or computing devices. For example, database 120 may represent a portion of client 206 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as client 206 in FIG. 2, computing system 810 in FIG. 8, and/or portions of exemplary network architecture 900 in FIG. 9.

Figure 2:
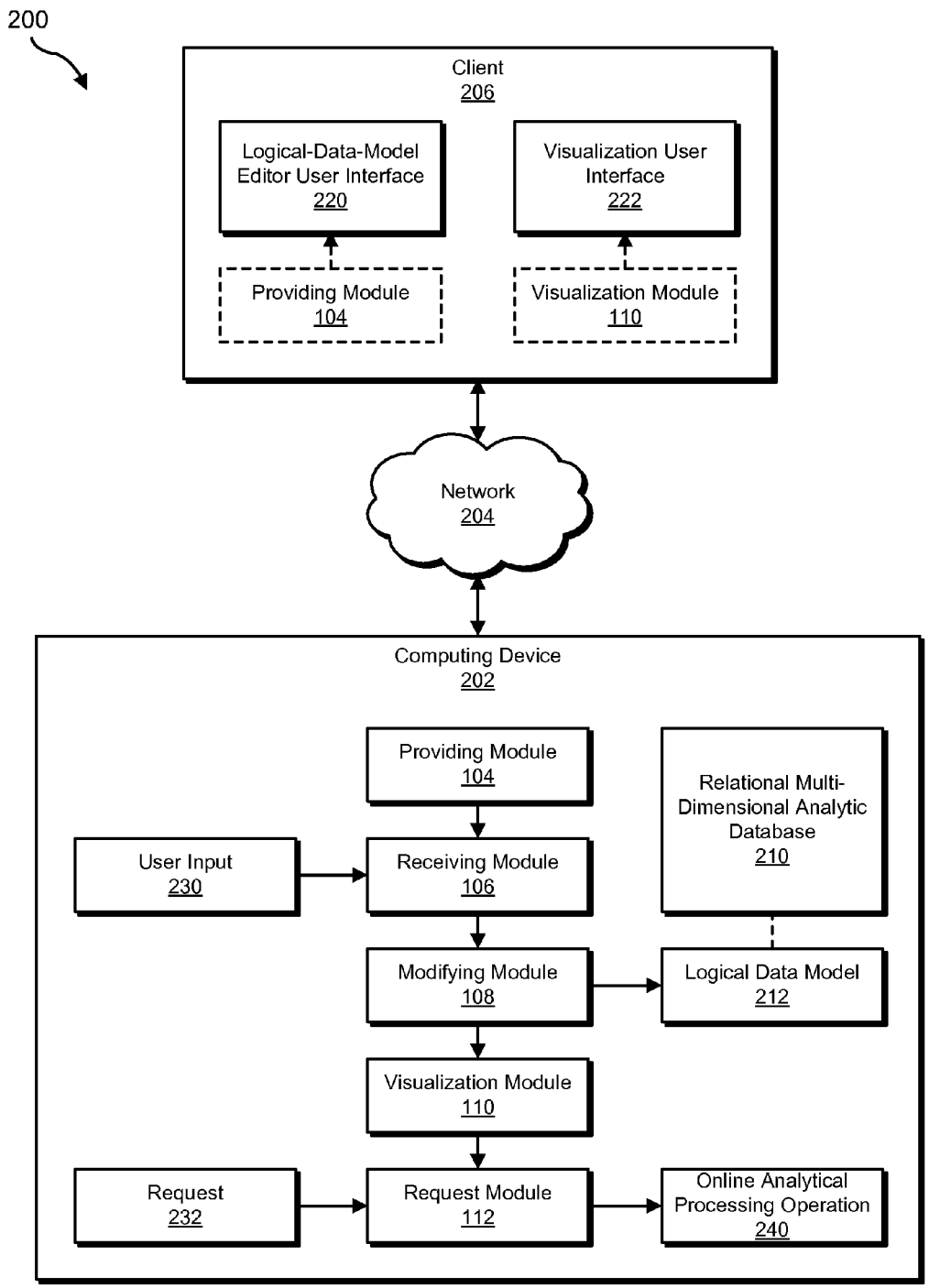
FIG. 2 is a block diagram of an exemplary system for performing customized large-scale data analytics.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client 206 via a network 204. In one example, computing device 202 may be programmed with one or more of modules 102 and/or may store all or a portion of the data in database 120. Additionally or alternatively, client 206 may be programmed with one or more of modules 102 and/or may store all or a portion of the data in database 120.

In one embodiment, one or more of modules 102 from FIG. 1 may, when executed by at least one processor of computing device 202 and/or client 206, facilitate computing device 202 and/or client 206 in performing customized large-scale data analytics. For example, and as will be described in greater detail below, providing module 104 may be programmed to provide a logical-data-model editor user interface 220 to enable modifying a logical data model 212 of a relational multi-dimensional analytic database 210. Receiving module 106 may be programmed to receive, via logical-data-model editor user interface 220, user input 230 to modify logical data model 212 of relational multi-dimensional analytic database 210. Modifying module 108 may be programmed to modify logical data model 212 of relational multi-dimensional analytic database 210 based on user input 230. Visualization module 110 may be programmed to provide a visualization user interface 222, based on logical data model 212, to enable performing online analytical processing operations. Request module 112 may be programmed to receive, via visualization user interface 222, a request 232 to perform an online analytical processing operation 240 that provides a view of data stored within relational multi-dimensional analytic database 210 in accordance with logical data model 212.

Computing device 202 and client 206 generally represent any type or form of computing device capable of reading computer-executable instructions. Examples of computing device 202 and client 206 include, without limitation, laptops, tablets, desktops, servers, cellular phones, Personal Digital Assistants (PDAs), multimedia players, embedded systems, combinations of one or more of the same, exemplary computing system 810 in FIG. 8, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 900 in FIG. 9, or the like. Network 204 may facilitate communication or data transfer using wireless or wired connections. In one embodiment, network 204 may facilitate communication between computing device 202 and client 206.

Figure 3:
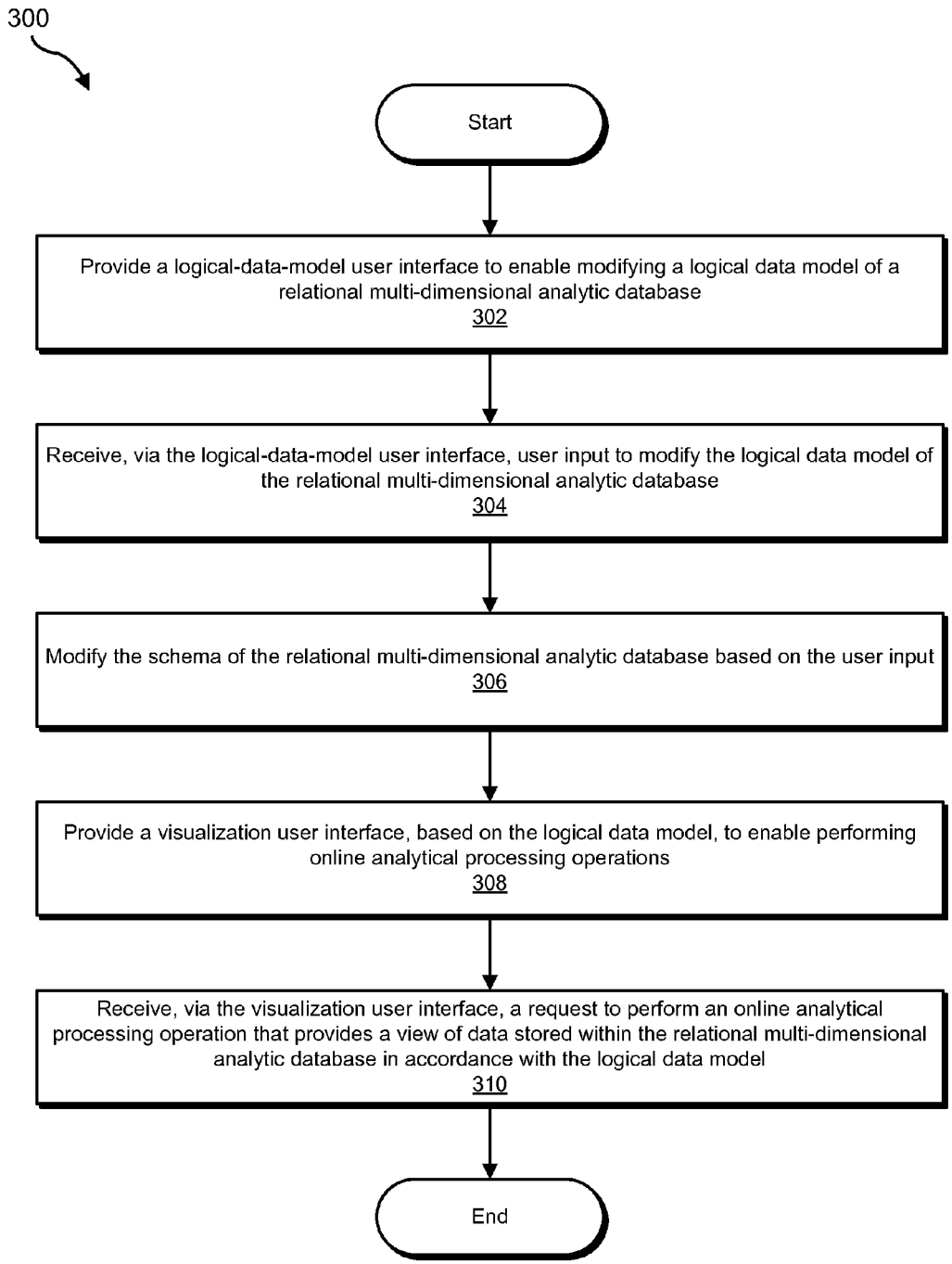
FIG. 3 is a flow diagram of an exemplary method for performing customized large-scale data analytics.

FIG. 3 is a flow diagram of an exemplary computer-implemented method 300 for performing customized large-scale data analytics. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may provide a logical-data-model user interface to enable modifying a logical data model of a relational multi-dimensional analytic database. For example, providing module 104 may, as part of computing device 202 in FIG. 2, provide a logical-data-model editor user interface 220 to enable modifying a logical data model 212 of a relational multi-dimensional analytic database 210.

The phrase "relational multi-dimensional analytic database," as used herein, generally refers to any relational database (e.g., a database management system and/or data that is accessible by a database management system) that may be used for relational online analytical processing and that organizes data by dimensions, hierarchical dimensions, and/or measures. In one example, the relational multi-dimensional analytic database may accept Structured Query Language ("SQL") queries. As a relational database, the relational multi-dimensional analytic database may include a set of database tables (e.g., a fact table representing measures and one or more tables representing dimensions). As used herein, the term "measure" may refer to any datum of interest to be analyzed across differing dimensions. In some examples, a measure may correspond to a performance indicator (or "key performance indicator") for an organization (e.g., sales data for a corporation). As another example, in the computing security domain, a measure may correspond to a security risk indicator and/or a security incident indicator.

In some examples, the relational multi-dimensional analytic database may use a non-proprietary format. Accordingly, the relational multi-dimensional analytic database may provide access to stored data via a relational database management system and thereby enable access to stored data via one or more features of the relational database management system (e.g., to improve performance and/or scalability). For example, one or more of the systems described herein may access the relational multi-dimensional analytic database through federated database servers.

In some examples, and as will be described in greater detail below, one or more of the systems described herein may use one or more analytics data access objects. As used herein, the phrase "data access object" may refer to any structure, module, element, function, and/or mapping for accessing data from a database (e.g., with a given layout) in a predefined format and/or according to a predefined view. For example, the analytics data access objects may include database views (e.g., a virtual table corresponding to a stored query that is dynamically generated), stored procedures (e.g., subroutines that are available to applications to access the database), and/or database functions.

As mentioned earlier, in some examples the relational multi-dimensional analytic database may include tables representing one or more hierarchical dimensions. In some examples, and as will be explained in greater detail below, the relational multi-dimensional analytic database may include one or more trend tables that store and organize trending information into one or more time-based dimensions (e.g., in a hierarchy of time dimensions relating to different time spans, such as years, quarters, months, and/or weeks).

In some examples, one or more of the systems described herein may populate the relational multi-dimensional analytic database. For example, the disclosed systems may (1) retrieve new data from a plurality of data stores, (2) normalize the new data, and (3) populate the relational multi-dimensional analytic database with the new data. In some examples, these systems may retrieve the new data in response to the new data being entered into one of the plurality of data stores and/or in response to a notification from one of the plurality of data stores that new data has arrived. Additionally or alternatively, these systems may retrieve the new data by periodically requesting new data from the plurality of data stores.

In some examples, one or more of the systems described herein may normalize the new data by converting the new data from the plurality of data stores into a consistent format. Additionally or alternatively, these systems may integrate, collocate, and/or centrally store the normalized data (e.g., in a data warehouse).

In addition, in some examples the systems described herein may, as a part of normalizing the new data, analyze the new data (e.g., before populating the relational multi-dimensional analytic database with the normalized data). In some examples, these systems may analyze the new data by correlating data entries within the new data. For example, these systems may correlate data that identifies security threats across machines and/or over time. In some examples, normalizing the new data may include analyzing the new data to identify (1) a security threat (e.g., a malware variant), (2) a security vulnerability (e.g., a property of a computing environment that may be exploited by an attack), (3) a security risk (e.g., a risk of a given computing environment being subject to a successful attack, a risk of a given computing environment being subject to data loss, etc.), and/or (4) a security incident trend.

In some examples, the systems described herein may retrieve the new data from the plurality of data stores in parallel. In these examples, the disclosed systems may normalize the new data from the plurality of data stores in parallel. Additionally or alternatively, the systems described herein may analyze normalized (or partly normalized) data from a data warehouse in parallel.

The term "logical data model," as used herein, generally refers to any logical representation and/or model of data stored within a database. In some examples, the logical data model may represent an organization of data by measures, dimensions (including, e.g., hierarchical dimensions and/or time dimensions), cardinalities of dimensions, and/or links to an underlying physical data model. In addition, the term "cardinality," as used herein, may specify relationships between instances of measures and/or dimensions. Examples of cardinalities include, without limitation, "one," "many," "one or more," "one and only one," "zero or one," and "zero or many." Accordingly, as an example, relationships between instances may include, for example, one-to-one relationships and one-to-many relationships.

Providing module 104 may provide the logical-data-model user interface to enable modifying the logical data model of the relational multi-dimensional analytic database in any suitable manner. For example, providing module 104 may expose (and/or connect with) a graphical user interface on a client system that allows a developer and/or a user to define and/or control one or more measures and/or dimensions (including dimension hierarchies) to structure access to the relational multi-dimensional analytic database. In some examples, the logical-data-model user interface may enable a user to modify the logical data model by enabling a user to create the logical data model.

Figure 4:
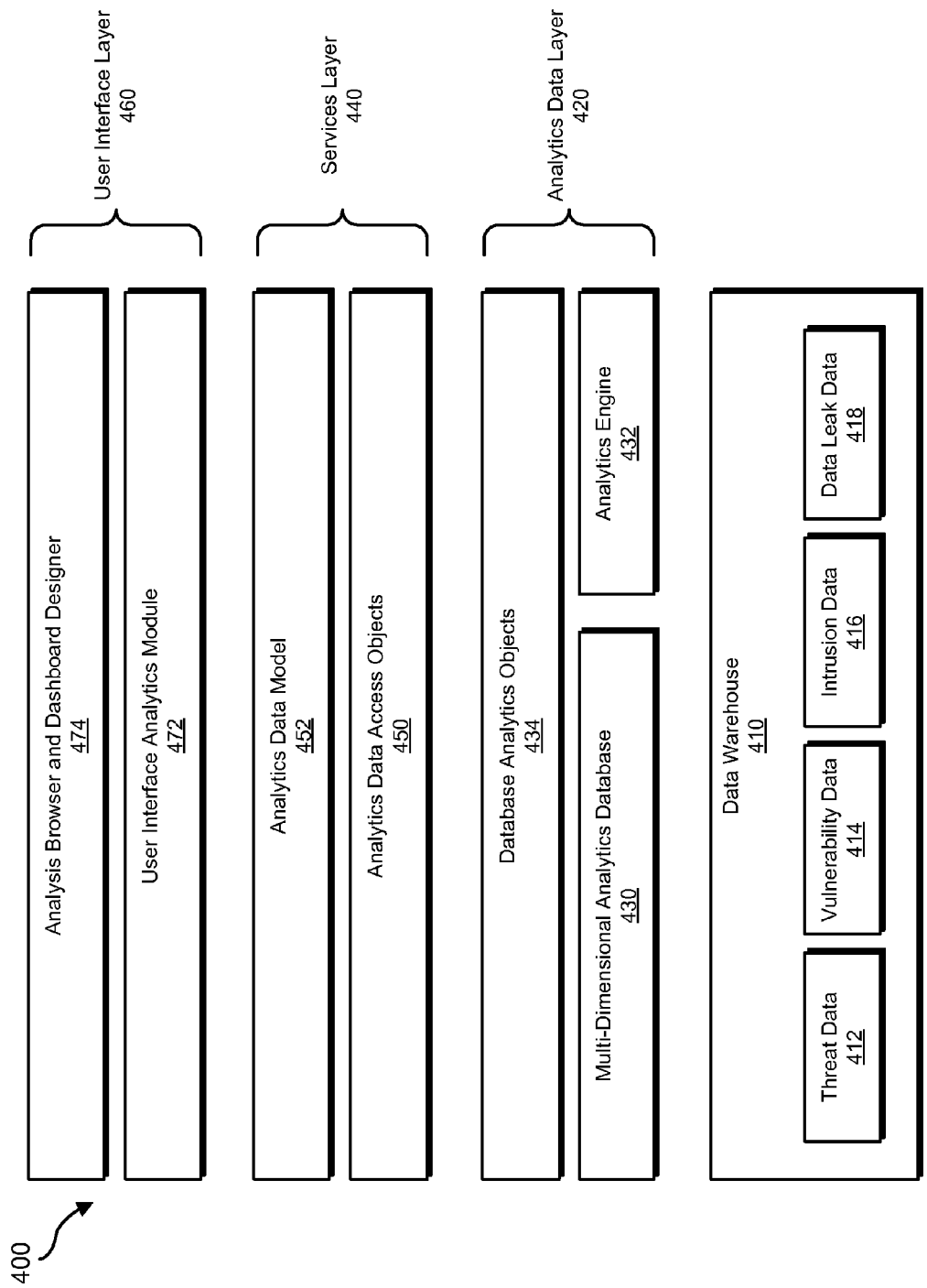
FIG. 4 is a block diagram of an exemplary system for performing customized large-scale data analytics.

Turning to a high-level example to provide context for the multi-dimensional analytics database, FIG. 4 illustrates an exemplary system 400. As shown in FIG. 4, exemplary system 400 may include a data warehouse 410 (including, e.g., threat data 412, vulnerability data 414, intrusion data 416, and/or data leak data 418). Exemplary system 400 may also include an analytics data layer 420 that includes a multi-dimensional analytics database 430, an analytics engine 432 that processes and analyzes data from data warehouse 410 to populate multi-dimensional analytics database 430, and database analytics objects 434 that expose multi-dimensional analytics database 430 to a services layer 440. Services layer 440 may include analytics data access objects 450 (e.g., such as database views and/or stored procedures) and an analytics data model 452. A user interface layer 460 may include a user interface analytics module 472 and an analysis browser and dashboard designer 474 for performing online analytical processing operations on multi-dimensional analytics database 430 (e.g., through analytics data model 452). Using FIG. 4 as an example, at step 302 providing module 104 may provide a user interface to modify analytics data model 452.

Figure 5:
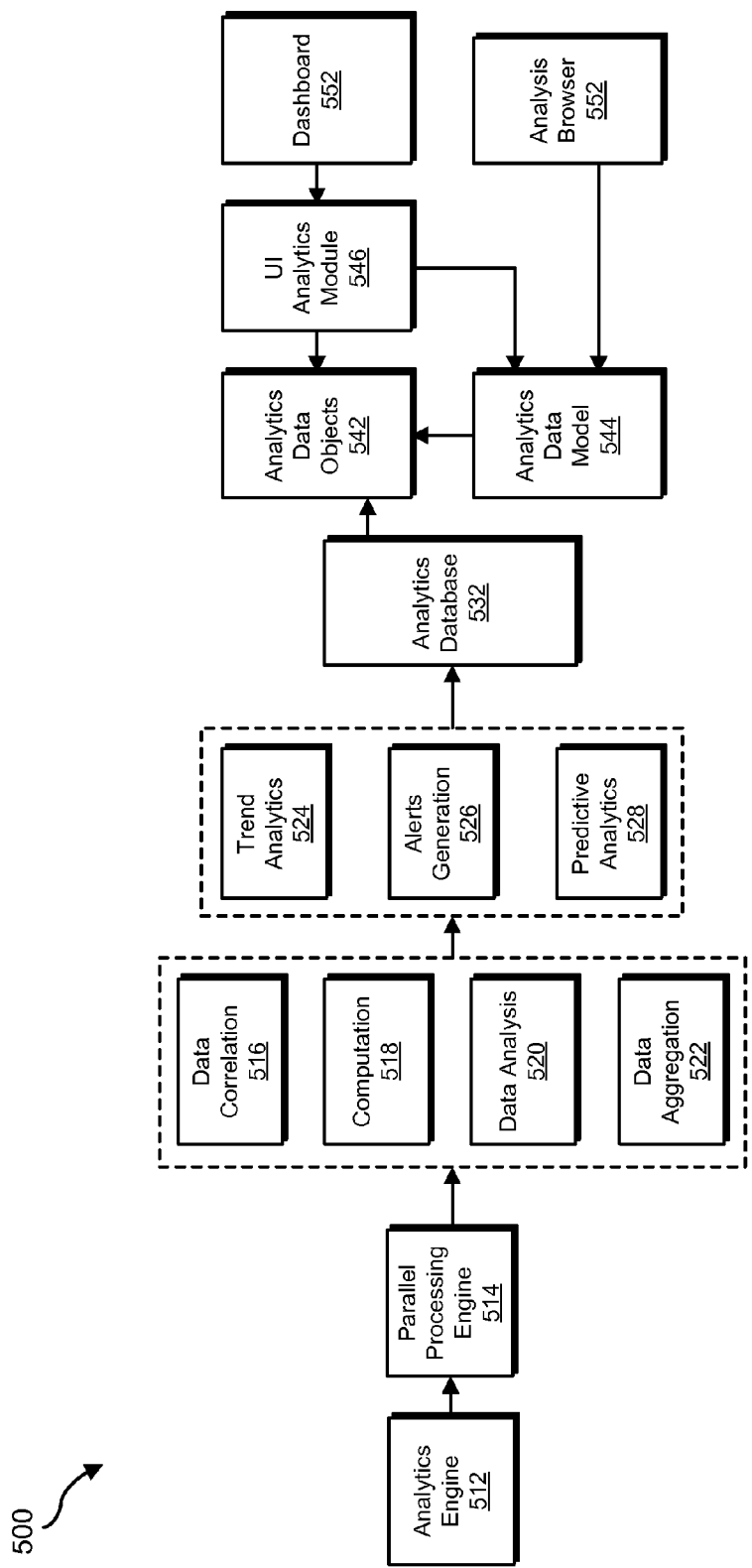
FIG. 5 is a block diagram of an exemplary system for performing customized large-scale data analytics.

For another high-level example to provide context for the multi-dimensional analytics database, FIG. 5 illustrates an exemplary system 500. As shown in FIG. 5, exemplary system 500 may include an analytics engine 512 that, via a parallel processing engine 514, sends data for initial correlation, analysis, aggregation, and other computational manipulations (e.g., a data correlation 516, a computation 518, a data analysis 520, and/or a data aggregation 522). System 500 may then forward the data to identify trends, generate alerts based on the data analysis (e.g., in a security context, generating an alert for a prevalent security threat, risk, and/or vulnerability), and predict future data points (e.g., at trend analytics 524, alerts generation 526, and/or predictive analytics 528). System 500 may then forward the results of the various data analysis, correlation, and aggregation operations to an analytics database 532. An analysis browser 552 may enable a user to browse through data within analytics database 532 (and, in some examples, through the data in a data warehouse on which the data within the analytics database is based) through a view defined by an analytics data model 544 that accesses analytics database 532 via analytics data objects 542. Likewise, a dashboard 552 may provide a user with an interface to view data within analytics database 532. A UI analytics module 546 may convert requests from dashboard 552 to queries executable on analytics data objects 542 based on analytics data model 544.

Returning to FIG. 3, at step 304 one or more of the systems described herein may receive, via the logical-data-model user interface, user input to modify the logical data model of the relational multi-dimensional analytic database. For example, receiving module 106 may, as part of computing device 202 in FIG. 2, receive, via logical-data-model editor user interface 220, user input 230 to modify logical data model 212 of relational multi-dimensional analytic database 210.

Receiving module 106 may receive any of a variety of user input to modify the logical data model of the relational multi-dimensional analytic database. For example, receiving module 106 may receive user input to define a measure and/or a dimension within the logical data model of the relational multi-dimensional analytic database.

Figure 6:
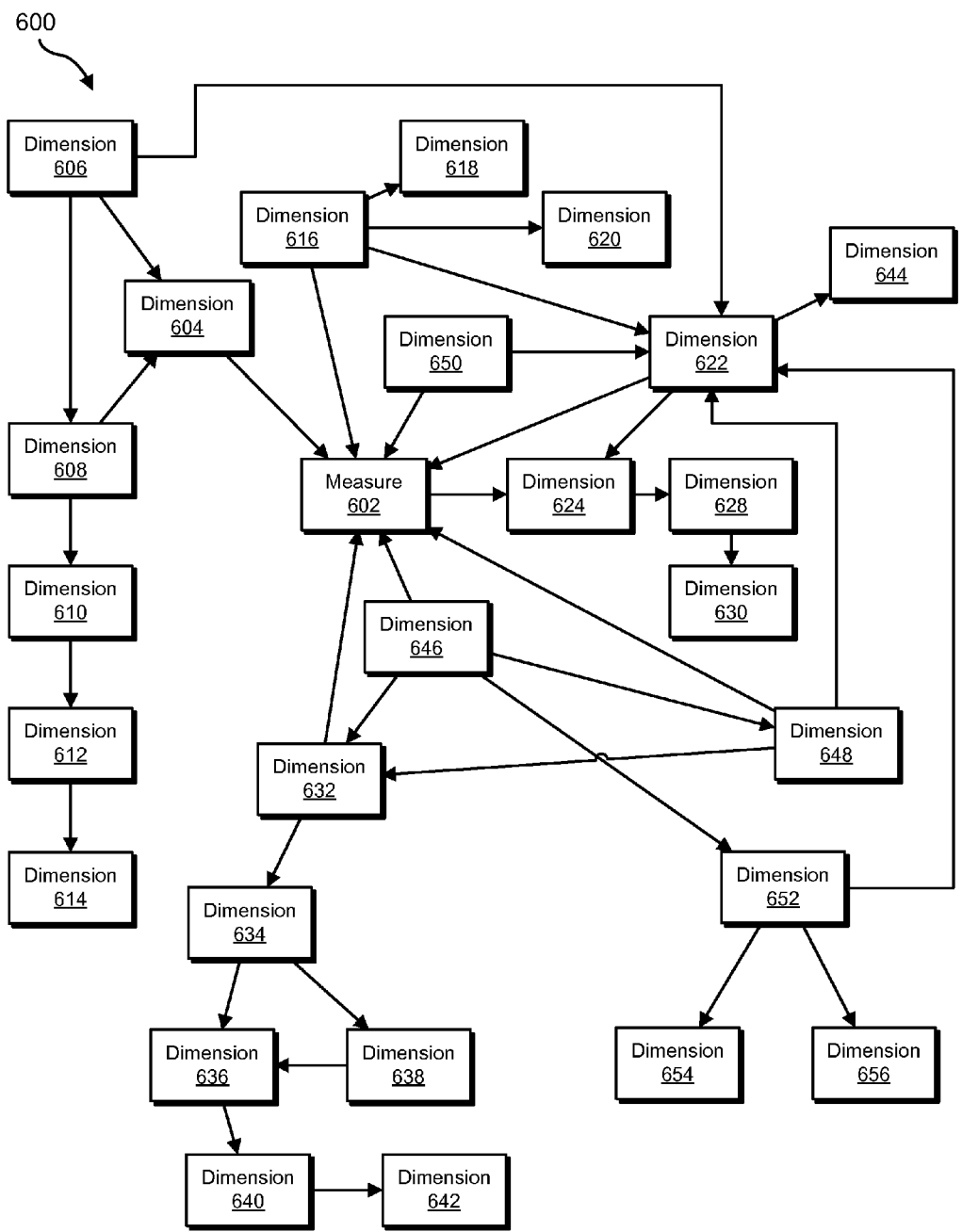
FIG. 6 is a block diagram of an exemplary database design for performing customized large-scale data analytics.

For an example of a relational multi-dimensional analytic database, FIG. 6 illustrates a database 600. In this example, database 600 may include a measure 602 that, for example, represents a fact table within database 600. Dimensions 604-656 may correspond to tables within database 600 and may represent dimensions pertaining to measure 602 (e.g., dimensions across which measure 602 may be viewed). Some dimensions within database 600, including, for example, dimension 608, dimension 616, dimension 622, and dimension 632, may represent hierarchical dimensions. In this example, a hierarchical dimension may represent the aggregation of data in the dimensions below the hierarchical dimension.

In one example, measure 602 may represent one or more risk scores (e.g., corresponding to computing security risks). In this example, dimensions 605-656 may represent various dimensions across which risk scores may be viewed, including, e.g., threats, vulnerabilities, attacks, and/or incidents relating to the risk scores, time windows (e.g., at varying levels of granularity), machines and their locations (e.g., at varying levels of granularity), policies and mandates (and compliance therewith), remediation plans, etc.

Figure 7:
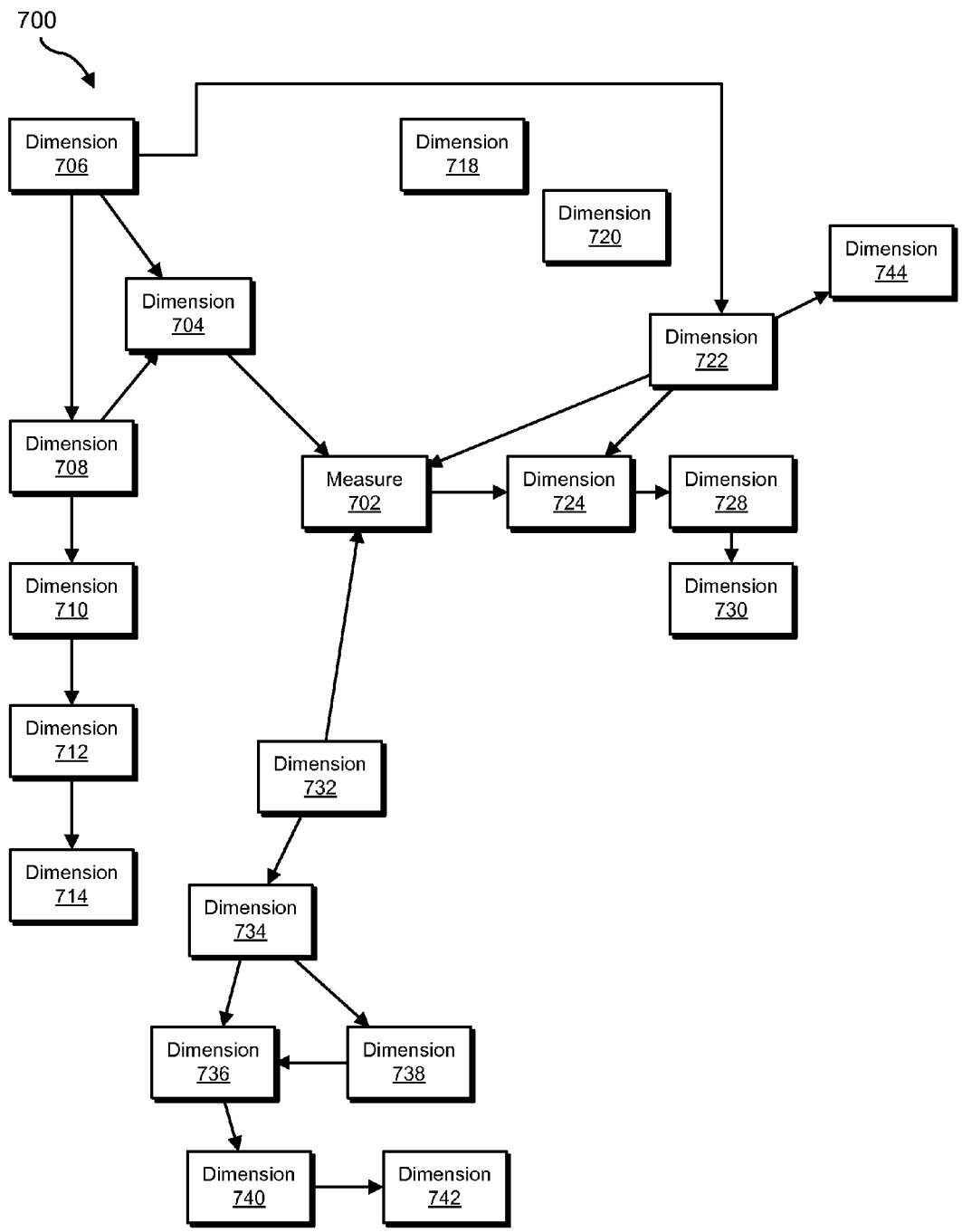
FIG. 7 is a block diagram of an exemplary data model for performing customized large-scale data analytics.

FIG. 7 illustrates an exemplary logical data model 700. In some examples, the systems described herein may expose data model 700 to user interfaces (e.g., an analytics browser, a dashboard, etc.) that provide views to the underlying relational multi-dimensional analytic database through data model 700. In one example, exemplary logical data module 700 may relate to database 600. For example, measure 702 may correspond to measure 602 in FIG. 2. Likewise, dimensions 704, 706, 708, 710, 712, 714, 718, 720, 722, 724, 728, 730, 732, 734, 736, 738, 740, 742, and 744 may correspond to dimensions 604, 606, 608, 610, 612, 614, 618, 620, 622, 624, 628, 630, 632, 634, 636, 638, 640, 642, and 644 in FIG. 6, respectively. Accordingly, at step 304 receiving module 106 may receive user input to create logical data model 700 (e.g., by selecting measure 702 and/or dimensions 704, 706, 708, 710, 712, 714, 718, 720, 722, 724, 728, 730, 732, 734, 736, 738, 740, 742, and 744 from database 600).

Returning to FIG. 3, at step 306 one or more of the systems described herein may modify the logical data model of the relational multi-dimensional analytic database based on the user input. For example, modifying module 108 may, as part of computing device 202 in FIG. 2, modify logical data model 212 of relational multi-dimensional analytic database 210 based on user input 230.

Modifying module 108 may modify the logical data model of the relational multi-dimensional analytic database in any suitable manner. For example, modifying module 108 may define a measure within the logical data model of the relational multi-dimensional analytic database, a dimension within the logical data model of the relational multi-dimensional analytic database, a hierarchical dimension within the logical data model of the relational multi-dimensional analytic database, and/or a cardinality within the logical data model of the relational multi-dimensional analytic database. In one example, modifying module 108 may generate data model 700 in FIG. 7 according to user input.

Returning to FIG. 3, at step 308 one or more of the systems described herein may provide a visualization user interface, based on the logical data model, to enable performing online analytical processing operations. For example, visualization module 110 may, as part of computing device 202 in FIG. 2, provide a visualization user interface 222, based on logical data model 212, to enable performing online analytical processing operations.

The phrase "online analytical processing operation," as used herein, may refer to any operation for creating a view of multi-dimensional data. In some examples, an online analytical processing operation may include an operation to move from an initial view of multi-dimensional data to a related view of multi-dimensional data. The online analytical processing operation may also include (1) a roll-up operation that creates an aggregated view of data across a specified dimension, (2) a drill-down operation that creates a differentiated view of data within a specified dimensional value, (3) a slicing operation that creates a lower-dimensional view of data by limiting a specified dimension to a specified dimensional value, and/or (4) a dicing operation that creates a view that excludes at least one dimensional value of at least one dimension.

The systems described herein may perform step 308 in a variety of ways. In some examples, visualization module 110 may provide a dashboard as a visualization user interface. In this example, the dashboard may display one or more graphs, charts (including, e.g., pareto charts, bar charts, pie charts, spline charts, line charts, area charts, gauge charts, etc.), and/or reports as a part of one or more panes and/or panels.

Returning to FIG. 3, at step 310 one or more of the systems described herein may receive, via the visualization user interface, a request to perform an online analytical processing operation that provides a view of data stored within the relational multi-dimensional analytic database in accordance with the logical data model. For example, request module 112 may, as part of computing device 202 in FIG. 2, receive, via visualization user interface 222, a request 232 to perform an online analytical processing operation 240 that provides a view of data stored within relational multi-dimensional analytic database 210 in accordance with logical data model 212.

Request module 112 may receive the request in any suitable manner. For example, request module 112 may receive user input via an interaction with one or more data elements displayed in a graph, chart, and/or report within a dashboard.

In some examples, one or more of the systems described herein may perform the online analytical processing operation. In some examples, these systems may perform the online analytical processing operation by generating a database query based on the request and the logical data model and performing the database query. For example, user interface analytics module 472 in FIG. 4 may receive the request from analysis browser and dashboard designer 474 and generate and execute a database query based on the request and on analytics data model 452. As another example, UI analytics module 546 may, as a part of FIG. 5, receive a request from dashboard 552 and generate and execute a database query based on the request and on analytics data model 544.

As discussed earlier, the systems and methods described herein may provide a variety of benefits. For example, these systems and methods may reduce technology procurement costs and/or reduce specialized skill requirements by using existing open, standard, and/or non-proprietary technologies (e.g., SQL SERVER, ORACLE, MYSQL, .NET, C#, ASP-.NET, etc.). Additionally, these systems and methods may provide high flexibility and customizability. Where some traditional Business Intelligence technologies may require defining an online analytical processing cube storage structure without future customization, the systems and methods described herein may represent data as a set of database tables that may be customized according to requirements. In addition, in some examples the systems described herein may target security-related data by, for example, including measures such as risk scores and incident trends and dimensions such as threats, vulnerabilities, and machines.

As a high-level overview, the systems described herein may include an analysis browser that allows a user to analyze underlying data by selecting dimensions, measures, and/or filters. The analysis browser may also allow a user to perform multi-level drilldown operations on hierarchical dimensions, perform data orientations, etc. These systems may also include an analytics data model editor that allows a user to define, manage, and/or control dimensions, hierarchical dimensions, relationships between entities, members of dimensions, and/or measures. The analytics data model may reference analytics data access objects that may, in turn, provide access to data within an analytics database. The systems described herein may also including a trend analytics engine that processes data for each day and creates and stores sequential historical records available for trend analysis. These systems may store trend data to allow a user to drill-down according to a time dimension (e.g., by year, by quarter, by month, by week, by day, etc.).

In some examples, the systems described herein may allow a user to perform an online analytics processing operation that modifies a view within a logical data model. Additionally or alternatively, these systems may enable a user to move a view from one logical data model to another logical data model. In another example, these systems may enable a user to move a view from a logical data model to a data warehouse. Additionally or alternatively, these systems may enable a user to move a view from a data warehouse to a logical data model.

Figure 8:
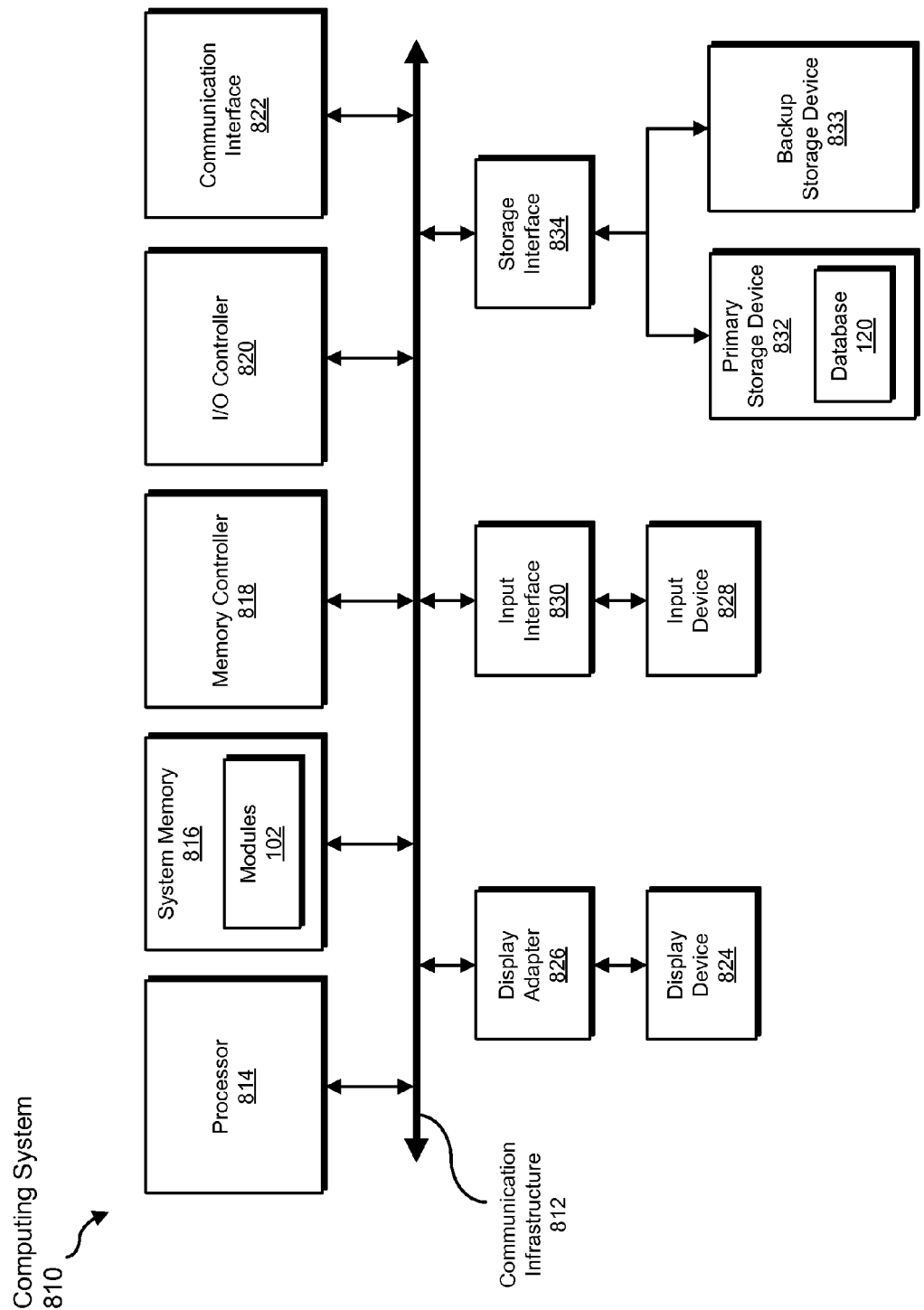
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830.

Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 810. All or a portion of the computer program stored on the computer-readable-storage medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
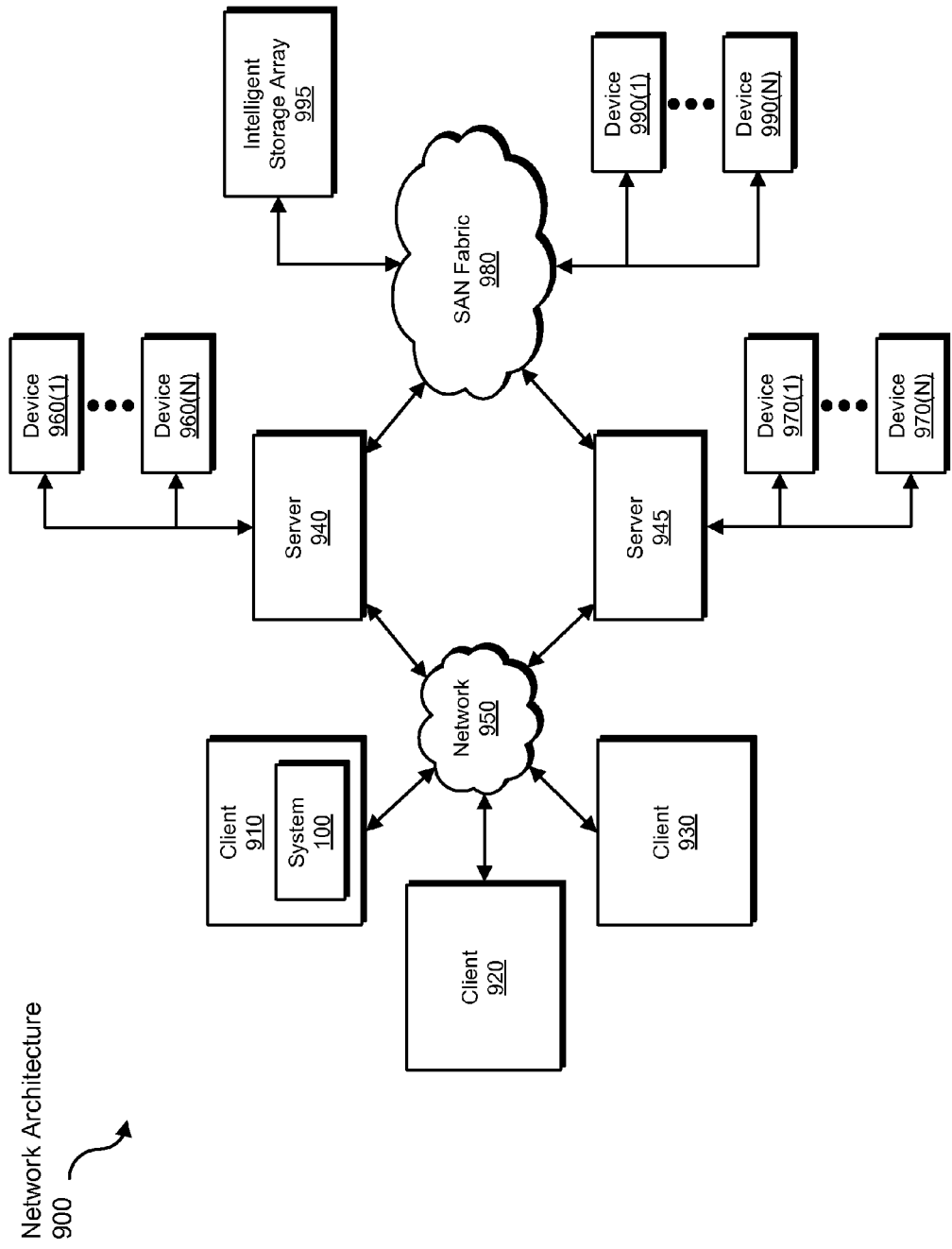
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for performing customized large-scale data analytics.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data within a relational multi-dimensional database to be transformed, transform the data according to a logical model, output a result of the transformation to a user interface, use the result of the transformation to modify a view of the data, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing customized large-scale data analytics, at least a portion of the method being performed by a computing device comprising at least one processor, the method comprising:
   providing a logical-data-model user interface to enable modifying a logical data model of a relational multi-dimensional analytic database by providing a representation of data currently stored within the relational multi-dimensional analytic database via the logical-data-model user interface;
   receiving, via the logical-data-model user interface, user input to modify the logical data model of the relational multi-dimensional analytic database, the user input identifying the data currently stored within the relational multi-dimensional analytic database;
   modifying the logical data model of the relational multi-dimensional analytic database based on the user input by adding a dimension to the logical data model that represents the data currently stored within the relational multi-dimensional analytic database;
   providing a visualization user interface, after modifying the logical data model, to enable performing online analytical processing operations on a multi-dimensional dataset defined by the logical data model, wherein the multi-dimensional dataset defined by the logical data model excludes at least one irrelevant dimension representing data stored within the relational multi-dimensional analytic database, thereby initiating browsing of the relational multi-dimensional analytic database with a starting view limited to the multi-dimensional dataset defined by the logical data model;
   receiving, via the same visualization user interface, a request to perform an online analytical processing operation that provides a subsequent view of data stored within the relational multi-dimensional analytic database in accordance with the logical data model, thereby facilitating browsing the relational multi-dimensional analytic database from the starting view to the subsequent view without browsing through any view that comprises the irrelevant dimension.

2. The computer-implemented method of claim 1, further comprising performing the online analytical processing operation.

3. The computer-implemented method of claim 2, wherein performing the online analytical processing operation comprises:
   generating a database query based on the request and the logical data model;
   performing the database query.

4. The computer-implemented method of claim 1, wherein the online analytical processing operation comprises at least one of:
   a roll-up operation that creates an aggregated view of data across a specified dimension;
   a drill-down operation that creates a differentiated view of data within a specified dimensional value;
   a slicing operation that creates a lower-dimensional view of data by limiting a specified dimension to a specified dimensional value;
   a dicing operation that creates a view that excludes at least one dimensional value of at least one dimension.

5. The computer-implemented method of claim 1, further comprising:
   retrieving new data from a plurality of data stores;
   normalizing the new data;
   populating the relational multi-dimensional analytic database with the new data.

6. The computer-implemented method of claim 5, wherein normalizing the new data comprises analyzing the new data by correlating data entries within the new data.

7. The computer-implemented method of claim 5, wherein normalizing the new data comprises analyzing the new data to identify at least one of:
   a security threat;
   a security vulnerability;
   a security risk;
   a security incident trend.

8. The computer-implemented method of claim 5, wherein:
retrieving the new data from the plurality of data stores comprises retrieving the new data from the plurality of data stores in parallel;
normalizing the new data comprises normalizing the new data from the plurality of data stores in parallel.

9. The computer-implemented method of claim 1, wherein modifying the logical data model of the relational multi-dimensional analytic database based on the user input comprises modifying at least one of:
a dimension within the logical data model of the relational multi-dimensional analytic database;
a measure within the logical data model of the relational multi-dimensional analytic database;
a hierarchical dimension with the logical data model of the relational multi-dimensional analytic database;
a cardinality within the logical data model of the relational multi-dimensional analytic database.

10. The computer-implemented method of claim 1, wherein:
an analytics engine populates the relational multi-dimensional analytic database;
an analysis browser enables browsing through data within the relational multi-dimensional analytics database through a defined view that is defined by an analytics data model that accesses the multi-dimensional analytics database via a set of analytics data objects;
a dashboard provides a user with an interface to view data within the relational multi-dimensional analytics database;
an analytics module converts requests from the dashboard to queries executable on the set of analytics data objects based on the analytics data model.

11. A system for performing customized large-scale data analytics, the system comprising:
a providing module that provides a logical-data-model user interface to enable modifying a logical data model of a relational multi-dimensional analytic database by providing a representation of data currently stored within the relational multi-dimensional analytic database via the logical-data-model user interface;
a receiving module that receives, via the logical-data-model user interface, user input to modify the logical data model of the relational multi-dimensional analytic database, the user input identifying the data currently stored within the relational multi-dimensional analytic database;
a modifying module that modifies the logical data model of the relational multi-dimensional analytic database based on the user input by adding a dimension to the logical data model that represents the data currently stored within the relational multi-dimensional analytic database;
a visualization module that provides a visualization user interface, after modifying the logical data model, to enable performing online analytical processing operations on a multi-dimensional dataset defined by the logical data model, wherein the multi-dimensional dataset defined by the logical data model excludes at least one irrelevant dimension representing data stored within the relational multi-dimensional analytic database, thereby initiating browsing of the relational multi-dimensional analytic database with a starting view limited to the multi-dimensional dataset defined by the logical data model;
a request module that receives, via the same visualization user interface, a request to perform an online analytical processing operation that provides a subsequent view of data stored within the relational multi-dimensional analytic database in accordance with the logical data model, thereby facilitating browsing the relational multi-dimensional analytic database from the starting view to the subsequent view without browsing through any view that comprises the irrelevant dimension;
at least one processor configured to execute the providing module, the receiving module, the modifying module, the visualization module, and the request module.

12. The system of claim 11, further comprising a performing module that performs the online analytical processing operation.

13. The system of claim 12, wherein the performing module performs the online analytical processing operation by:
generating a database query based on the request and the logical data model;
performing the database query.

14. The system of claim 11, wherein the online analytical processing operation comprises at least one of:
a roll-up operation that creates an aggregated view of data across a specified dimension;
a drill-down operation that creates a differentiated view of data within a specified dimensional value;
a slicing operation that creates a lower-dimensional view of data by limiting a specified dimension to a specified dimensional value;
a dicing operation that creates a view that excludes at least one dimensional value of at least one dimension.

15. The system of claim 11, further comprising a normalization module that:
retrieves new data from a plurality of data stores;
normalizes the new data;
populates the relational multi-dimensional analytic database with the new data.

16. The system of claim 15, wherein the normalizing module normalizes the new data by analyzing the new data by correlating data entries within the new data.

17. The system of claim 15, wherein the normalizing module normalizes the new data by analyzing the new data to identify at least one of:
a security threat;
a security vulnerability;
a security risk;
a security incident trend.

18. The system of claim 15, wherein:
the retrieving module retrieves the new data from the plurality of data stores by retrieving the new data from the plurality of data stores in parallel;
the normalizing module normalizes the new data by normalizing the new data from the plurality of data stores in parallel.

19. A non-transitory computer-readable-storage medium comprising one or more computer-readable instructions that, when executed by at least one processor of a computing device, cause the computing device to:
provide a logical-data-model user interface to enable modifying a logical data model of a relational multi-dimensional analytic database by providing a representation of data currently stored within the relational multi-dimensional analytic database via the logical-data-model user interface;
receive, via the logical-data-model user interface, user input to modify the logical data model of the relational multi-dimensional analytic database, the user input identifying the data currently stored within the relational multi-dimensional analytic database;

modify the logical data model of the relational multi-dimensional analytic database based on the user input by adding a dimension to the logical data model that represents the data currently stored within the relational multi-dimensional analytic database;

provide a visualization user interface, after modifying the logical data model, to enable performing online analytical processing operations on a multi-dimensional dataset defined by the logical data model, wherein the multi-dimensional dataset defined by the logical data model excludes at least one irrelevant dimension representing data stored within the relational multi-dimensional analytic database, thereby initiating browsing of the relational multi-dimensional analytic database with a starting view limited to the multi-dimensional dataset defined by the logical data model;

receive, via the same visualization user interface, a request to perform an online analytical processing operation that provides a subsequent view of data stored within the relational multi-dimensional analytic database in accordance with the logical data model, thereby facilitating browsing the relational multi-dimensional analytic database from the starting view to the subsequent view without browsing through any view that comprises the irrelevant dimension.

* * * * *

UNITED STATES PATENT AND TRADEMARK OFFICE
CERTIFICATE OF CORRECTION

PATENT NO. : 9,063,960 B2
APPLICATION NO. : 14/025755
DATED : June 23, 2015
INVENTOR(S) : Shubhabrata Mohanty and Sujit Manolikar Page 1 of 1

It is certified that error appears in the above-identified patent and that said Letters Patent is hereby corrected as shown below:

On the Title Page, at (72), the Inventors should read:

Shubhabrata Mohanty, Magarpatta City (IN); Sujit Manolikar, Pimple Saudagar (IN)

Signed and Sealed this
Sixteenth Day of February, 2016

Michelle K. Lee
*Director of the United States Patent and Trademark Office*